No. 890,722. PATENTED JUNE 16, 1908.
C. P. STEINMETZ.
REGULATION OF DYNAMO ELECTRIC MACHINES.
APPLICATION FILED AUG. 7, 1905. RENEWED JAN. 31, 1908.
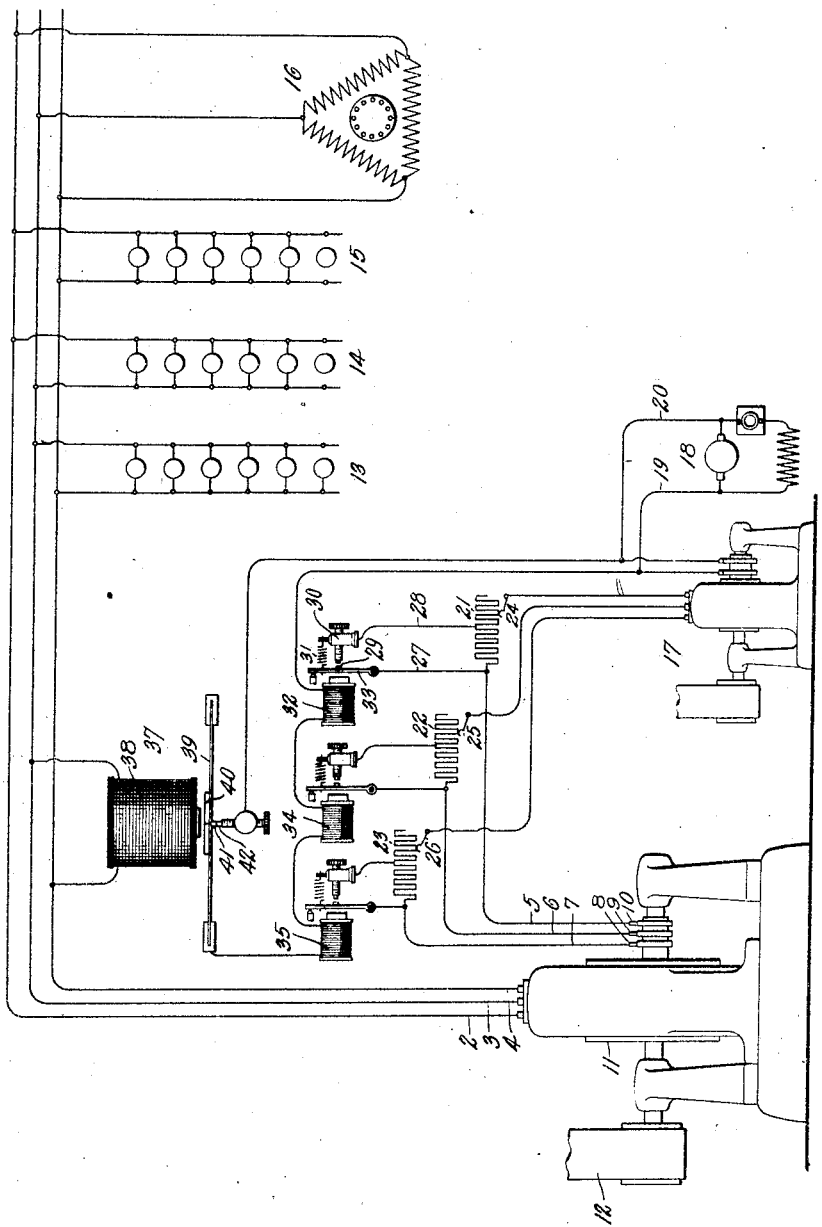
WITNESSES:
INVENTOR:
Charles P. Steinmetz,
By Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

REGULATION OF DYNAMO-ELECTRIC MACHINES.

No. 890,722.    Specification of Letters Patent.    Patented June 16, 1908.

Application filed August 7, 1905, Serial No. 273,933. Renewed January 31, 1908. Serial No. 413,610.

*To all whom it may concern:*

Be it known that I, CHARLES P. STEINMETZ, a citizen of the United States, residing at Schenectady, county of Schenectady, and State of New York, have invented certain new and useful Improvements in Regulation of Dynamo-Electric Machines, of which the following is a specification.

My present invention relates to the generation and distribution of alternating currents and has for its object the provision of means whereby the voltage of the generating source may be maintained constant with variation of load, or if desired may be made to rise as the load comes on, in order thereby to maintain a constant potential at some more or less distant point on the distribution system. In carrying my invention into practice I make use of a generator having its field member excited by low frequency multiphase alternating currents. The exciting circuits carrying the low frequency currents are connected to a suitable exciting machine of the desired low frequency, say four and six cycles per second, and in the leads extending to this exciting machine I connect in series suitable adjustable resistances.

If the rotating member of the generator be now rotated in such a manner that currents produced in the generating windings of the generator have a frequency corresponding to the difference of the two frequencies due respectively to the mechanical rotation in the machine and to the rotation of the field due to the exciting currents, then the generator operates after the manner characteristic of an induction motor driven above synchronism. In this case the two members of the generator each generate current which flows in the case of one member to the distribution circuit and in the case of the other member to the exciter. The currents flowing to the exciter traverse the resistances in the exciter circuits and thereby drop in potential so that it will be seen that the voltage of the exciter circuit near the generator is higher than at the exciter. As the current delivered by the main generator to the distribution system increases in value the current flowing into the exciter circuit from the generator increases correspondingly in value because the currents in the rotor and stator of the main generator are produced by the same flux. Therefore as the load on the main generator increases the voltage supplied to the exciter circuits by the main generator increases likewise, while the voltage supplied to the consumption circuit of the main generator also increases. Now by varying the resistance in the exciter circuit it is evident, assuming the voltage of the exciter to be maintained constant or approximately so, that the voltage of the main generator may thereby be adjusted. This result I accomplish by automatic means responsive to the voltage of that portion of the distribution system at which it is desired to maintain a constant potential.

As to the features of novelty which characterize my invention I have endeavored to point these out with particularity in the appended claims.

For a better understanding of the invention itself, reference is to be made to the accompanying drawings taken in connection with the following specification.

In the drawings, the main alternating current generator is indicated in general at 1 and consists in the present instance, of a machine resembling in general construction an ordinary induction motor. Each of the two members of the machine is provided with a multiphase winding, in this case a three-phase winding. The three-phase terminals extending from the stator of the machine are indicated at 2, 3 and 4, respectively, while the three-phase terminals from the rotor are indicated at 5, 6 and 7 and connect through suitable collector rings and brushes 8, 9 and 10, to points in the winding on the rotor 11. The machine may be driven from any suitable source of power, as for example, by means of a belt 12.

The stator is in the present instance chosen as the generating member of the machine and the leads therefrom connect to any suitable distribution system indicated in the present instance as supplying banks of lamps 13, 14 and 15 and motors, such for example as the induction motor 16. These translating devices are merely illustrative of some suitable load.

The rotor of the machine, which serves in the present instance as the exciting member, is connected through its leads 5, 6 and 7 to the exciter 17 of low frequency multiphase currents. This exciter may be of any suitable construction and is driven at a rate such as to produce low frequency multiphase exciting voltages. The direct current field excitation of the exciter is in the present case, received from a small direct current exciter 18, the leads of which are indicated at 19 and 20. In the exciter leads 5, 6 and 7 extending between the generator and exciter 17, I connect respectively in series therewith, adjustable resistances 21, 22 and 23. These resistances may be adjusted semi-permanently by means of shiftable contacts 24, 25 and 26. In order to adjust the resistances in response to the variation of voltage on the main generator system, I provide for each resistance a vibratory short-circuiting device. Thus for example, in the case of the resistance 21, two leads 27 and 28, one from one terminal of the resistance and the other from some intermediate point, are connected one to a vibrating contact 29 and the other to an adjustable fixed contact 30. A spring 31 urges these contacts together and is so insulated as to avoid electrically connecting them. A relay magnet 32 when energized moves the armature 33, carrying the contact point 29, so as to break engagement with the fixed contact 30 and thereby open circuit that portion of the resistance 21 comprised between the leads 27 and 28. When deënergized the magnet allows the armature to return and short-circuit this portion of the resistance. In a similar manner the resistances 22 and 23 are provided with short-circuiting devices which, being the same in character as that already described, require no further description. They are indicated at 34 and 35.

The relay magnets of the three short-circuiting devices are connected in series and receive current from any suitable source, as for example, from the exciter 18. In order to control these relay magnets I make use of the main vibrator 37 consisting of a magnet 38 connected across two of the leads of the distribution system and coöperating with a tightly stretched ribbon or strip 39. This ribbon carries an armature 40 which may be attracted by the magnet 38 and also carries a contact 41 coöperating or engaging an adjustable fixed contact 42. When these contacts are together the relay magnets 32, 34 and 35 are energized and thereby attract their corresponding armatures, thus open circuiting the shunts about the respective resistances 21, 22 and 23. The entire resistances are thus in circuit. When the contacts 41 and 42 separate the relay magnets close the short-circuits about the said resistances. Now these resistances are so chosen that when the short-circuits are opened there will be an excess of resistance in circuit, and the voltage of the main generator will tend to rise considerably above the desired value of voltage, while when the resistances are short-circuited either in whole or in part the voltage will tend to fall considerably below the desired value. Now assuming the parts to be in the position as indicated in the drawing, in which the resistances are open circuited, it will be seen that the voltage on the regulating magnet 38 will tend to increase above normal. The magnet will thus increase in strength and withdraw its armature 40, thereby separating the contacts 41 and 42 and thereby deënergizing the relay magnets 32, 34 and 35. The armatures of these magnets will then be drawn back by their controlling springs and will thus close circuits about their respective resistances. The voltage of the main generator will then tend to fall and thereby weaken the magnet 38, whereupon the armature of the magnet moves away and closes the contacts 41 and 42. The relays then act to open the short-circuits about the resistances. This operation is repeated with such rapidity that the voltage of the main generator has no time to vary appreciably from a constant value, and as a matter of fact, it is found in practice that the vibrations of the regulator are so rapid as to maintain a practically constant voltage. The slight variations of voltage, to which the vibration of the regulator is due, are practically indistinguishable.

It is evident that the regulating magnet 38 which controls the regulating resistance may be connected to any portion of the system where it is desired to maintain constant potential. Thus it may be connected either at the generator terminals or it may be connected so as to be responsive to the voltage at some distant point of the system. However it be connected it operates to maintain constant voltage at the point to which it is connected.

What I claim as new, and desire to secure by Letters Patent of the United States, is,—

1. The combination of a dynamo electric machine having a multiphase exciting winding and a multiphase generating winding, a low frequency exciting circuit connected to said exciting winding, voltage consuming devices in said exciting circuit, and means responsive to variation of voltage of said generating winding for controlling said voltage consuming devices.

2. The combination of a dynamo electric machine having a multiphase exciting winding and a multiphase generating winding, a low frequency exciting circuit connected to said exciting winding, resistances in said exciting circuit, and means responsive to the voltage of said generating winding for controlling said resistances.

3. The combination of a dynamo electric machine having a multiphase exciting winding and a multiphase generating winding, a low frequency exciting circuit connected to said exciting winding, voltage consuming devices in said exciting circuit, and a vibrator responsive to the voltage of said generating winding for controlling said voltage consuming devices.

In witness whereof, I have hereunto set my hand this 4th day of August, 1905.

CHARLES P. STEINMETZ.

Witnesses:
BENJAMIN B. HULL,
MABEL E. HULL.